US008560377B2

(12) United States Patent
Ohnemus et al.

(10) Patent No.: US 8,560,377 B2
(45) Date of Patent: Oct. 15, 2013

(54) COMPUTER-BASED RATING SYSTEM AND METHOD HAVING MID-QUARTILE FILTER

(75) Inventors: Peter Ohnemus, Baar (CH); Henrik Steffensen, Walchwil (CH); Peter Pircher, Baar (CH)

(73) Assignee: ASSET4, Zug (CH)

( * ) Notice: Subject to any disclaimer, the term of this patent is extended or adjusted under 35 U.S.C. 154(b) by 567 days.

(21) Appl. No.: 12/426,436

(22) Filed: Apr. 20, 2009

(65) Prior Publication Data

US 2009/0271249 A1  Oct. 29, 2009

Related U.S. Application Data

(60) Provisional application No. 61/047,254, filed on Apr. 23, 2008.

(51) Int. Cl.
*G06Q 10/00* (2012.01)
(52) U.S. Cl.
USPC .......................... 705/7.39; 705/7.38
(58) Field of Classification Search
USPC .............. 705/7.29, 35, 2, 7.39, 7.38; 707/999.003
See application file for complete search history.

(56) References Cited

U.S. PATENT DOCUMENTS

| | | | |
|---|---|---|---|
| 7,277,864 B2 | 10/2007 | Ohnemus | |
| 8,010,399 B1 * | 8/2011 | Bruce et al. | 705/7.29 |
| 2002/0052820 A1 * | 5/2002 | Gatto | 705/36 |
| 2003/0028527 A1 * | 2/2003 | Crosby et al. | 707/3 |
| 2003/0182181 A1 * | 9/2003 | Kirkwood et al. | 705/11 |
| 2003/0208388 A1 * | 11/2003 | Farkas et al. | 705/7 |
| 2005/0049948 A1 * | 3/2005 | Fuscone | 705/35 |
| 2005/0171881 A1 * | 8/2005 | Ghassemieh et al. | 705/35 |
| 2005/0209946 A1 * | 9/2005 | Ballow et al. | 705/35 |
| 2006/0200358 A1 | 9/2006 | Ohnemus | |
| 2006/0200375 A1 | 9/2006 | Ohnemus | |
| 2006/0200459 A1 | 9/2006 | Ohnemus | |
| 2006/0235778 A1 * | 10/2006 | Razvi et al. | 705/35 |
| 2007/0005477 A1 * | 1/2007 | McAtamney | 705/35 |
| 2008/0288285 A1 * | 11/2008 | Mancini et al. | 705/2 |

FOREIGN PATENT DOCUMENTS

WO   WO/2006/094224   9/2006

* cited by examiner

*Primary Examiner* — Johnna Loftis
(74) *Attorney, Agent, or Firm* — Leason Ellis LLP (57) ABSTRACT

A method for a rating system identifies user-selected performance indicators associated with one or more properties. A rating is computed for each of the user-selected performance indicators and for each entity in an entity class by applying at least the user-selected performance indicators to a rating algorithm. The entity class is divided into at least three approximately equal numbers of entity. For each of the performance indicator rating, the method sorts the performance indicator relative to a respective performance indicator of the other entity in the entity class, maps the sorted results to one of the at least three divisions of the entity class, and identifies and presents a portion of the user-selected performance indicators that represent indicators that outperform or underperform the entity class.

39 Claims, 9 Drawing Sheets

| Strength/Weakness Summary | Evolution of Score | Last Public Value | Previous Year | Two Years Ago |
|---|---|---|---|---|
| Strategic | | | | |
| Bonus Plan | ↗ | +Yes/Yes | +Yes/Yes | -No/No- |
| Compensation and Long Term Objectives | ↗ 350 | +Yes | +Yes | -No- |
| Donations in General | ↙ | +Yes/Yes | +Yes/Yes | +Yes/Yes |
| Female Male Ratio | ↗ | +26% | -NA- | -4%- |
| Return on Equity | ↙ | +24.7% | +31.7% | +23/1% |
| Anti Takeover Devices in Excess of Two | ↘ | (2) | -1- | -0- |
| Compensation Controversies | ↗ | (Yes) | -No- | -No- |
| Debt to Equity | ↗ | (23.11) | (-21.62) | (22.49) |
| Donations in Cash | ↗ | (0.0%) | (-0.0%) | -N/A- |
| Equal Voting Rights | ↗ | (No) | (-No) | -Yes- |
| Is or was the Chairman CEO | ↗ | (No/Yes) | (-No/Yes) | (-No/Yes) |
| Long-Term Debt | ↗ | (3.74) | (-3.32) | (2.54) |
| ROIC | ↙ | (2.0%) | (-2.2%) | (1.4%) |
| Operations | Evolution of Score | Last Public Value | Previous Year | Two Years Ago |
| Awards | ↗ | +9 | +7 | +9 |
| Cash Flow Growth | ↗ | +128.2% | +450.7% | -67.5%- |
| Employee Cost | ↗ | +17.9% | -20.4%- | -26.2%- |
| Employee Productivity | ↙ | +1385979 USD/Employee | +1124614 USD/Employee | +923325 USD/Employee |
| Income Taxes | ↗ | +2283.68 USD mio | +1935.46 USDMio | +1877.51 USDMio |
| Board Experience | ↘ | (4.2 Years) | (4.2 years) | (3.9 years) |
| Board Member Compensation | ↗ | (4.90 USDmio) | (4.61 USD Mio) | -N/A- |
| Energy Use | ↘ | (91.12 Kjoules/USD) | (127.32 Kjoules/USD) | -156.11 Kjoules/USD- |
| Net Margin | ↙ | (9.3) | -13.6%- | -11.4%- |
| Reporting | Evolution of Score | Last Public Value | Previous Year | Two Years Ago |
| Employee satisfaction | ↘ | +Yes | -No- | -No- |
| Green Buildings | ↘ | +Yes | +Yes | +Yes |
| Market Share | ↘ | +Yes | -Yes- | (No) |
| Compliance | Evolution of Score | Last Public Value | Previous Year | Two Years Ago |
| Audit and Accounting Fees | ↘ | +19.1% | -33.1%- | +11.1% |
| Credit Ratings | ↘ | +41 points | +41 points | +41 points |
| Family Friendly | ↘ | +Yes | +Yes | +Yes |
| GRI Report | = | (No) | -N/A- | -N/A- |

| | | |
|---|---|---|
| *Board Background and Skills | –Yes– | UBS AG, Aberdeen Asset Management PLC and 35 more companies... |
| Major Stakeholders | –No– | F & C Asset management PLC, Man Group PLC and 2 more companies... |
| Compliance | | |
| GRI Reporting | (No) | Nikko Capital Corp., State Street Corp. |
| *Shareholder Controversies | –No– | UBS, AG 31 Group PLC, Aberdeen Asset Management PLC and 43 more companies... |

446 ↙

- ☐ Icap PLC
- ☐ IGM Financials, Inc.
- ☐ Intermediate Capital Group, PLC
- ☐ Invesco Limited
- ☐ Investec PLC
- ☐ Janus Capital Group
- ☐ Julius Baer ← 438
- ☐ Legg Mason inc
- ☐ Lehman Brothers Holdings Inc
- ☐ Man Group PLC
- ☐ Mediobanca
- ☐ Mellon Financial Corp.
- ☐ Merrill Lynch & Company Inc
- ☐ MLP AG
- ☐ Morgan Stanley
- ☐ New Star Asset Management Group PLC
- ☐ Nikko Cordial Corp.
- ☐ Nomura Holdings Inc
- ☐ Northern Trust Corp.
- ☐ Rathbone Brothers PLC

Fig. 4A

One Click ESG

| Overview | Financials | Environment | Social | Corporate Governance |

UBS AG — 302

| KPI | My Public Value | Credit Suisse | Deutsche Bank AG | Julius Baer |
|---|---|---|---|---|
| Strategic | | | | |
| Board Specific Skills | –54%– | –54%– | –80%– | –(33%)– |
| Stock Options Vesting Period | –Yes– | –No– | –(No)– | –(No)– |
| Majority Shares | –N/A– | –N/A– | –0.01%– | –(27.20%)– |
| Ownership and Major Shareholder | –No– | –No– | –No– | –No– |
| Board Diversity | –Yes– | –Yes– | –Yes– | –Yes– |
| Is or was the Chairman CEO | –(No/Yes)– 524 | –No/No– | –No/No– | –No/No– |
| Stock Option Program | –No– | –No– | –No– | –No– |
| Compensation and Long Term Objectives | +Yes– 522 | –No– | –No– | –No– |
| Compensation Controversies | –(-Yes)– | –No– | –(Yes)– | –No– |
| Common Stocks | –Yes– | –Yes– | –Yes– | –Yes– |
| Equal Voting Rights | –(No)– | –No– | –Yes– | –Yes– |
| Anti Takeover Devices in Excess of Two | –(2)– | –0– | –(2)– | –0– |
| Operations | | | | |
| Number of Board Meetings | –7 meetings/year– | –8 meetings/year– | –(6 Meetings/year)– | –N/A– |
| Board Experience | –(4.2 years)– | –5.2 years– | –5.4 years– | –(3.7 years)– |
| Percentage of Independent Board Members | –77%– | –(0%)– | –(0%)– | –67%– |
| Board Member Compensation | –(4.90 USD mio)– | Performance score is in the bottom 25% of the benchmark. The score is 25.00% | –(4.47 USD mio)– | –(4.65 USD mio)– |
| Audit Committee Independence | –100%– | | –(0%)– | –100%– |
| Nomination Committee Independence | –100%– | –100%– | –100%– | –100%– |
| Board Size in Excess of Ten or Below | –2 members– | –3 members– | –(10 members)– | –1 members– |
| Term Duration | –3 years– | –3 years– | –(5 years)– | –N/A– |
| Reporting | | | | |
| Board Attendance Transparency | –(No)– | –No– | –No– | –No– |
| Individual Compensation | –No– | –No– | –No– | –No– |

Benchmark
- ☐ Capital Markets
- ☐ 31 Group PLC/VA
- ☐ Alliance Trust PLC
- ☐ Allied Capital Corp.
- ☐ American Capital Strategies
- ☐ Ameriprise Financial, Inc.
- ☐ Bank of New York Mellon Corp.
- ☐ Bear Stearns Companies, Inc.
- ☐ Close Brothers Group PLC
- ☑ Credit Suisse Group — 434
- ☐ D Carnegie & Co. AB
- ☐ Daiwa Securities Group, Inc.
- ☑ Deutsche Bank AG — 436
- ☐ E*Trade Financial Group
- ☐ F&C Asset Management PLC
- ☐ Federated Investors, Inc.
- ☐ Franklin Resources
- ☐ Goldman Sachs Group Inc.
- ☐ Henderson Group PLC

COMPUTER-BASED RATING SYSTEM AND METHOD HAVING MID-QUARTILE FILTER

CROSS-REFERENCE TO RELATED APPLICATIONS

The present application claims the benefit of U.S. patent application Ser. No. 61/047,254, filed Apr. 23, 2008 which is hereby incorporated by reference in its entirety.

FIELD OF THE INVENTION

The present invention relates to a computer-based rating system, and, more particularly, to a hosted rating system that is configured to manage transformations and presentations of multivariate, hierarchical data to users at client machines through an interface.

BACKGROUND OF THE INVENTION

As increasing quantities of data are gathered, correlated, and derived regarding almost anything on which data can be gathered, displaying this data in a form which can be easily and visually comprehended also increases in difficulty. A system for presenting this data so as to allow for the rapid absorption and processing of multiple categories of inter-related data is needed.

One example of the voluminous data being gathered, correlated, and generated can be illustrated by examining business entities. This data has expanded beyond mere financials to include regulatory, environmental, social, and financial influences. One instance of this that the business world more than ever is demanding a higher level of transparency in its statements and reports to the investing public, their executive management and board members and to the asset management industry. In part, this is due to the debacles caused by corporate scandals of major enterprises such as Enron, Worldcom, Parmalat and others in which investors and pension funds participants lost billions of dollars. Legislation has been passed in many countries to mandate guidelines for corporate governance and accounting. A notable example in the United States is the passage of the Sarbanes Oxley Act.

Many companies make use of their corporate websites to provide information to investors, analysts and the press. Based on the information provided, the performance of a company can be "benchmarked" relative to their peers. However, benchmarking in this manner is subjective, subject to human bias and is therefore cannot be applied across many companies in a precise manner. Neither are tools available for ready, objective benchmarking using prescribed or user-established criteria. Over the past eight years or so, the Swedish company Hallvarsson & Hallvarsson has measured the public performance of the Internet appearance for Europe's top 150 listed companies and the clear indication from their data is that above-average share performance is directly linked to good corporate behavior and true information sharing.

Frequently, the data presented to a user is in charts or tables that are comprised of meta-data or intermediate transformations of underlying data. The number of tables or columns in a table rapidly multiplies as more and more underlying data, meta-data, and intermediary calculations are incorporated into such charts and tables. Likewise, the ability of a user to reference multiple tables or columns in order to explore data underlying a calculation is complicated when hierarchical calculations of data and meta-data are involved.

More and more, automated systems are replacing static presentations of such charts and tables. A deficiency remains, however, in that known systems present too much information which, ironically, impedes the goal of transparency that is trying to be achieved.

SUMMARY OF THE INVENTION

Expressed generally, the present invention recognizes that a rating system that can operate upon the rating data and transform it through application of a mid-quartile filter would assist a user in comprehending trends in the data that are otherwise obscured among the rating data. The present invention is the first such system and method to recognize this problem and provide a solution.

In accordance with one aspect of the invention, a computer-implemented rating system has access to a database of data associated with, e.g. representative of, properties (e.g. physical or structural factors, information about configuration or the like) for each of a plurality of entities (e.g. product, device or company) belonging to an entity class. For example, the properties may comprise both economic and non-economic factors for a benchmark class of companies such as may be contained in a common industry, sector, or geographic region. The invention provides a method for the rating system, e.g. a method of operating the rating system. Through an interface, the method identifies user-selected performance indicators associated with one or more of the properties, e.g. economic and non-economic factors. A rating is computed for each of the user-selected performance indicators and for each entity, e.g. company in the benchmark class, by applying at least the user-selected performance indicators to a rating algorithm. The benchmark class is divided into at least three approximately equal numbers of companies. For each of the performance indicator ratings of a first entity, e.g. a first company of interest, the method sorts the performance indicator relative to a respective performance indicator of the other entities, e.g. companies in the benchmark class, maps the sorted results to one of the at least three divisions of the benchmark class, presents information relating to a first subset of the user-selected performance indicators that comprise the performance indicator ratings of the first company that are in the first and second divisions, and identifies the presented information as belonging to the first and second divisions, respectively.

Code executing in a processor of at least one machine that comprises the computer-implemented rating system is used to implement the functionality described herein.

A first division of the benchmark class has companies with a performance indicator rating indicative of underperformance, (e.g., a less favorable property evaluation) compared to other companies in the benchmark class. A second division of the benchmark class has companies with a performance indicator rating indicative of outperformance (e.g., a more favorable property evaluation) of other companies in the benchmark class. A third division has a remainder of the companies in the benchmark class.

Methods in accordance with further, optional aspects of the invention can be practiced in various combinations. In the foregoing method, the presenting step can present only the performance indicators that are in the first and second division and can further differentiate and emphasize the presented indicators through color-coding and graphic display elements. In addition or alternatively, the presenting step can include the steps of tabulating any performance indicator ratings of the first company that have been included in the first and second divisions.

Optionally, methods for implementing the rating system can include controls that are configured to cause a company selected by the user to be rated to be compared against a benchmark class or against individual members of the benchmark class. Methods in accordance with this optional aspect of the invention can identify which members of the benchmark class have a best in class rating, and highlight any user-selected indicator in which the company selected by the user to be rated has, in fact, best-in-class performance. Similarly, methods in accordance with this optional aspect of the invention can provide a direct comparison of the user-selected company to any the selected benchmark class members.

These and other features, aspects and advantages of the invention can be appreciated from the following Description of Certain Embodiments of the Invention and the accompanying Drawing Figures.

BRIEF DESCRIPTION OF THE DRAWING FIGURES

FIG. 5 illustrates the interface of FIG. 4 now adapted to provide direct comparison of a first company to selected peers.

DESCRIPTION OF CERTAIN EMBODIMENTS OF THE INVENTION

By way of overview and introduction, the present invention provides a computer-based rating system having a configurable user-interface that presents integrated ratings based on multiple sources of data.

Prior rating systems assigned to the present assignee have had integrated ratings calculated using data and formulae that the user can inspect so as to understand the rating being presented through the interface. Such systems have enabled users to interact with the user interface to explore complex, multivariate data, optionally in relation to the specific categories or in relation to other benchmark(s). In addition, such systems have enabled users to alter or filter the underlying data and formulae to arrive at ratings that take into account the user's preferences, perceptions, or hypotheticals. The volume of data being presented can obscure from direct view an appreciation as to which performance indicators are outperforming or underperforming other participants in the industry, or a sector, or within a common index. Accordingly, as a departure from prior rating systems, the present invention provides post-processing on the data underlying the integrated rating including a filtration process to exclude mid-band data that is indicative of average performance in the relevant benchmark category. Such information is not indicative of superior performance or underperformance in the benchmark category, and has lower analytical value to a user interested in gauging performance of the entity under investigation (e.g., a company being rated).

For purposes of illustration, the mid-band data being filtered out of the information being presented in the user-interface comprises any indicators whose values reside in the mid-quartiles. Filtration is by a filtration module (code or other software) configured to perform statistical divisions on the data as hereinafter described. A quartile is a statistical division of data in which four intervals are defined, with each containing 25% of the data. The lower, middle, and upper quartiles are computed by ordering the data from smallest to largest and then finding the values below which fall 25%, 50%, and 75% of the data. Stated another way, the post-rating processing causes any performance indicator that has a value in the first quartile (value worse than 75% of the data) or in the last quartile (value better than 75% of the data) to be presented in the interface as pertinent information regarding the entity's performance for that indicator. For the same entity, if the data is mid-range, say in line with approximately 26% to approximately 75% of the benchmark entities (e.g., when a quartile system is used), then that data is preferably omitted from the presentation of data in the user interface.

The rating algorithm(s) that can be used to rate a company can be varied and still be within the scope of the present invention. A suitable rating algorithm is described in U.S. Pat. No. 7,277,864, entitled "Sustainability Ratings And Benchmarking for Legal Entities," which issued on Oct. 2, 2007, the entirety of which is hereby incorporated by reference. For further information, see PCT Pub. No. WO/2006/094224, published on Sep. 8, 2006, and claiming priority from U.S. application Ser. Nos. 11/071,978, 11/071,981, and 11/071,980, all filed on Mar. 3, 2005, each of which is hereby incorporated by reference in its respective entirety. Generally, the rating algorithm relates underlying data that bears on the particular indicator that has been selected by the user as being of interest. The underlying data is related in a mathematical way so that one or more data items are processed to arrive at a value. Indicators can be combined by the rating algorithm, such as by individually weighting the indicators and combining them so as to define a rating score in a particular area (e.g., a societal sustainability rating, an environmental sustainability rating, a governance sustainability rating, and an economic sustainability rating). The scores in each area can be further combined into a composite score or integrated rating in a number of ways, optionally using further weighting coefficients. In this way, an overall rating for a company can be obtained. The rating algorithm is implemented in code executing in the processor and can be part of a rating module (code or other software) configured to relate the underlying data as described above to arrive at a value.

The illustrated embodiment is described in connection with a ratings system that can be hosted by a host machine (e.g., a web server) and publicly accessible to users at respective client machines through a connection to a distributed computer network; however, the invention is not so limited in application. The executables that comprise the rating system (e.g., the code, whether implemented as modules or a single executable program), can run on a stand-alone system and can be provided in a transportable format for local installation by a user, e.g., as a CD-ROM or in some other high-density storage medium. Likewise, the database can be maintained locally, and the local copy can include information on any companies, sectors or industries that are of interest to a particular user codified as "indicators" and arranged in a hierarchical structure within the database. At least one processor is configured by code such as software to access the database and compute ratings by applying prescribed ones of plural, discrete indicator values to at least a first ratings formula. This results in at least an integrated rating having a single value. This arrangement is particularly amenable to a pay-as-you go model in which users are charged for each company that they wish to inspect, though that same model can be used in a remote, hosted embodiment. The ratings system, regardless of where it resides, preferably is in communication with an update module such as code or other software that provides or can obtain electronically current information on the companies being watched, and current, pertinent benchmark information, and news alerts, if desired.

The figures represent one possible application of this invention applied to the financial sector. The example embodiments include the consideration of financial and non-financial data concerning a company, business sector, or industry. The financial and non-financial data can be arranged in a variety of ways including in accordance with one or more industry standards such as COSO (Committee of Sponsoring Organization of the Treadway Commission, which is a voluntary private sector organization dedicated to improving the quality of financial reporting through business ethics, effective internal controls and corporate governance). Through the interface, the user can enter configuration settings which cause the executables to arrange the data in one of these ways. The financial and non-financial data is presented in the user interface to permit an objective analysis of key performance indicators ("KPI") that the user is interested in seeing. However, the principles of the invention are not limited to application in the financial field. For example, the invention may also be used to compare the performance of equivalent physical components, e.g., mechanical elements in a machine or processors in a computer architecture, e.g., for use in monitoring system performance in real time.

Note that the user can select which KPIs are employed and can thereby increase or reduce the number of indicators under analysis by the rating algorithm.

Details concerning a network arrangement for practicing the present invention, as well as a further understanding of rating systems such as concerned by the present invention, are described in the aforesaid U.S. Pat. No. 7,277,864. That description also includes transparency of rating calculations, customizations of coefficients used in the rating algorithm, and alerts to users of changes in rating values based on worldwide market events, are of background interest to the present invention.

Figures 1, 2:
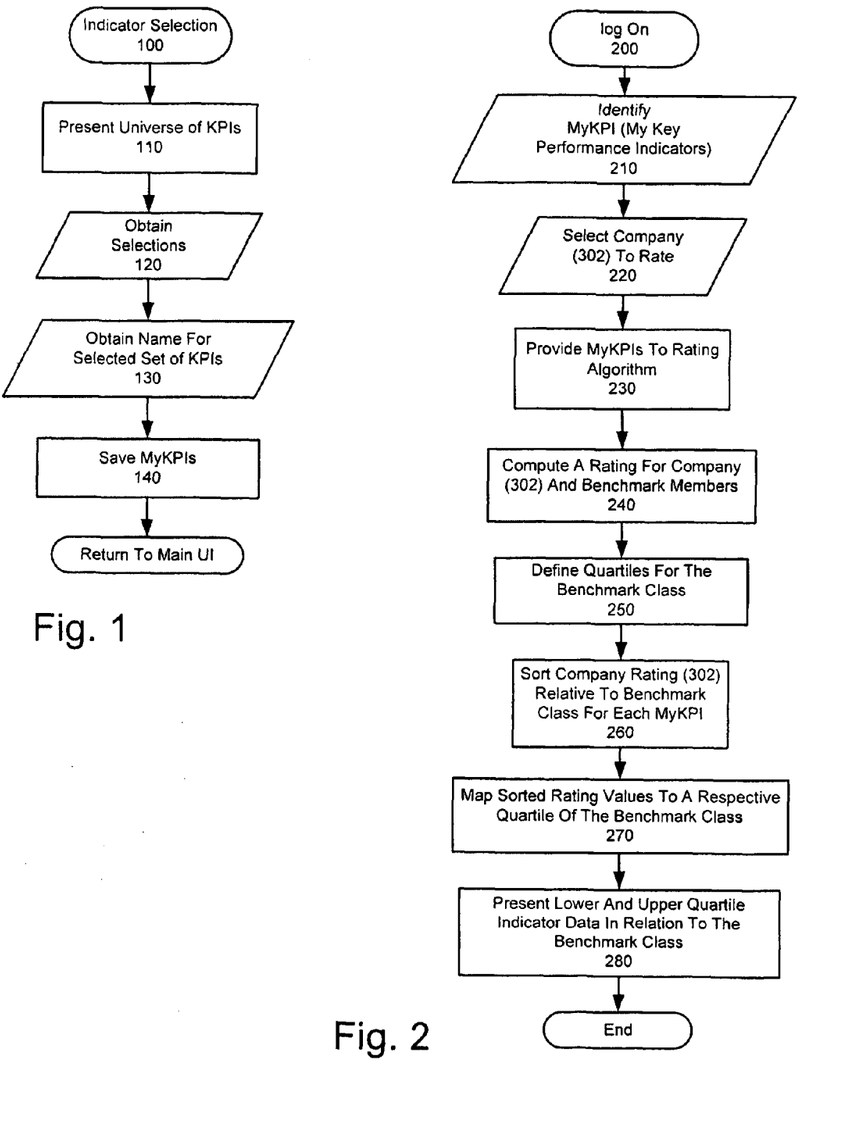
FIG. 1 is a flow diagram illustrating a process for selecting a subset of performance indicators that a user regards as key.
FIG. 2 is a flow diagram illustrating a rating process and post-rating process to present indicators having breakout performance (that is, outperformance or underperformance) relative to a benchmark class.

Referring now to the flow diagram in FIG. 1, users connect to the host system through an interface that is configured to present a set of key performance indicators ("KPIs") that collectively characterize all facets of any company's business. There can be several hundred indicators that define the universe of choices available to the user, some concerning economic factors and others concerning non-economic factors. The indicators can be arranged by category such that there is a more limited set of choices in each category, yet the categories together comprise the universe of choices. The categories preferably correspond to those of COSO or comprise financial, environmental, social responsibility, and corporate governance, as two non-limiting examples. Within each category, the indicators are specific to particular issues (e.g., operations can include indicators relating to awards, cash flow growth, employee cost, employee productivity, etc.).

The universe of indicators can be presented to the user, as indicated at block 110, for selection by the user through a switchboard or other interface component. The user can scroll through the list and click-select any indicators that are of interest. Selections are obtained by the host system at block 120, and can be made by simply toggling the indicator's status as selected or deselected. All of the indicators can initially be in a deselected state, by default. Alternatively, certain indicators can be pre-selected (and, hence, pre-defined as a group), such as when the user has indicated that he or she is establishing a list of KPIs for a particular sector. Optionally, the user can save the selections and associate a particular set of selections with a filename, as indicated at block 130. The selections are saved at block 140 and the user can continue interacting with the interface, as indicated at block 150. If desired, the user can repeat this flow to select and save different sets of indicators. This can be useful, for example, when the user identifies certain indicators as being useful when evaluating a company in the energy sector and identifies different indicators as being useful when evaluating a company in the financial sector.

The selected KPIs define the set of chosen performance indicators that are the core indicators used in the analytics of the rating algorithm, although ratings can be based on additional indicators in certain implementations of the invention. The KPIs help to organize, define, measure progress and analyze different entities and entity classes. The user can select which KPIs are to be included in a given category, and can in that way define custom categories. These settings are used by the code, when executed, to drive the rating algorithm and to influence the presentation of data through the user interface.

Figure 3:
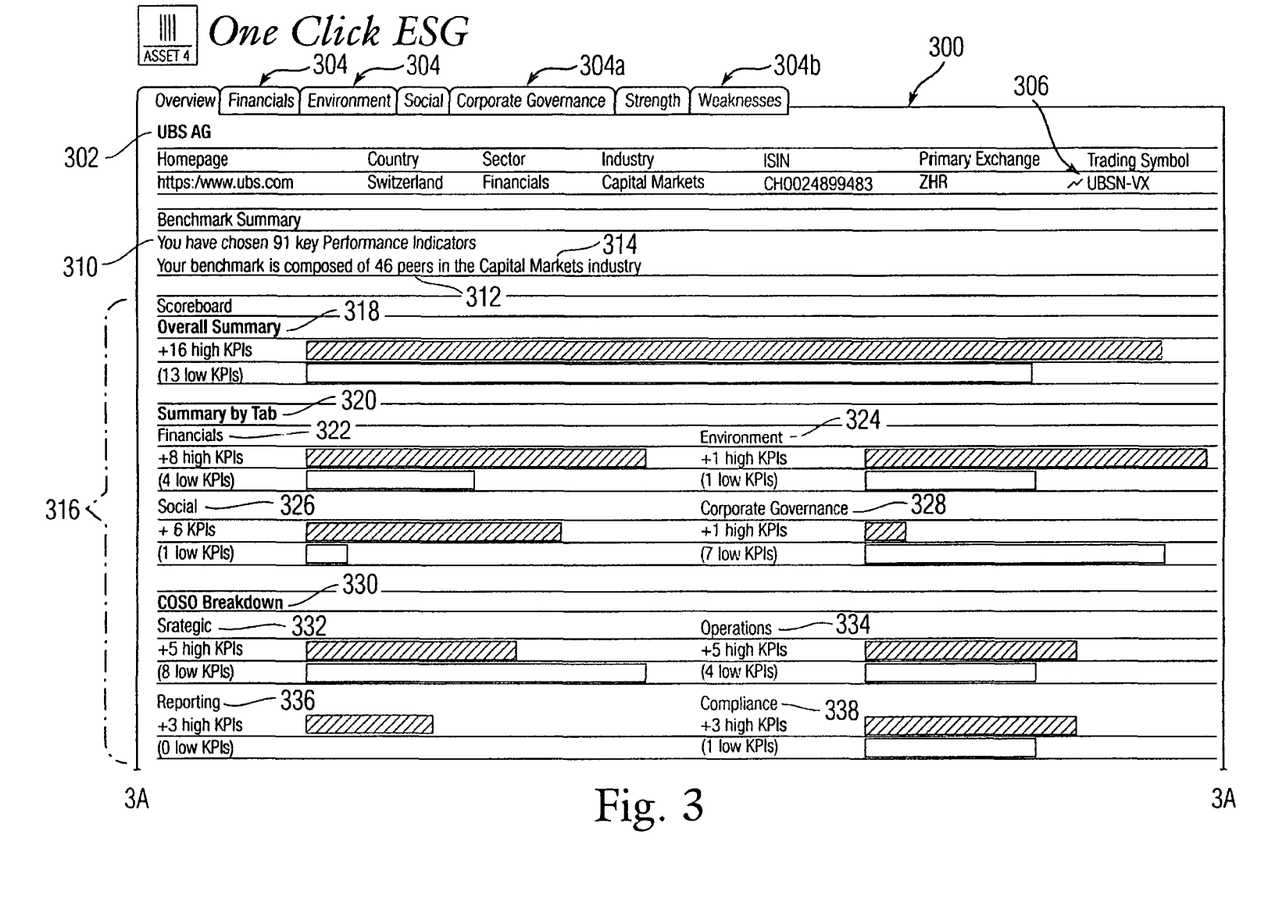
FIG. 3 is an interface presented by a host system to a user in accordance with an embodiment of the invention in which a set of key performance indicators are filtered to highlight those that reside in the lower and upper performance quartiles.
Figure 4:
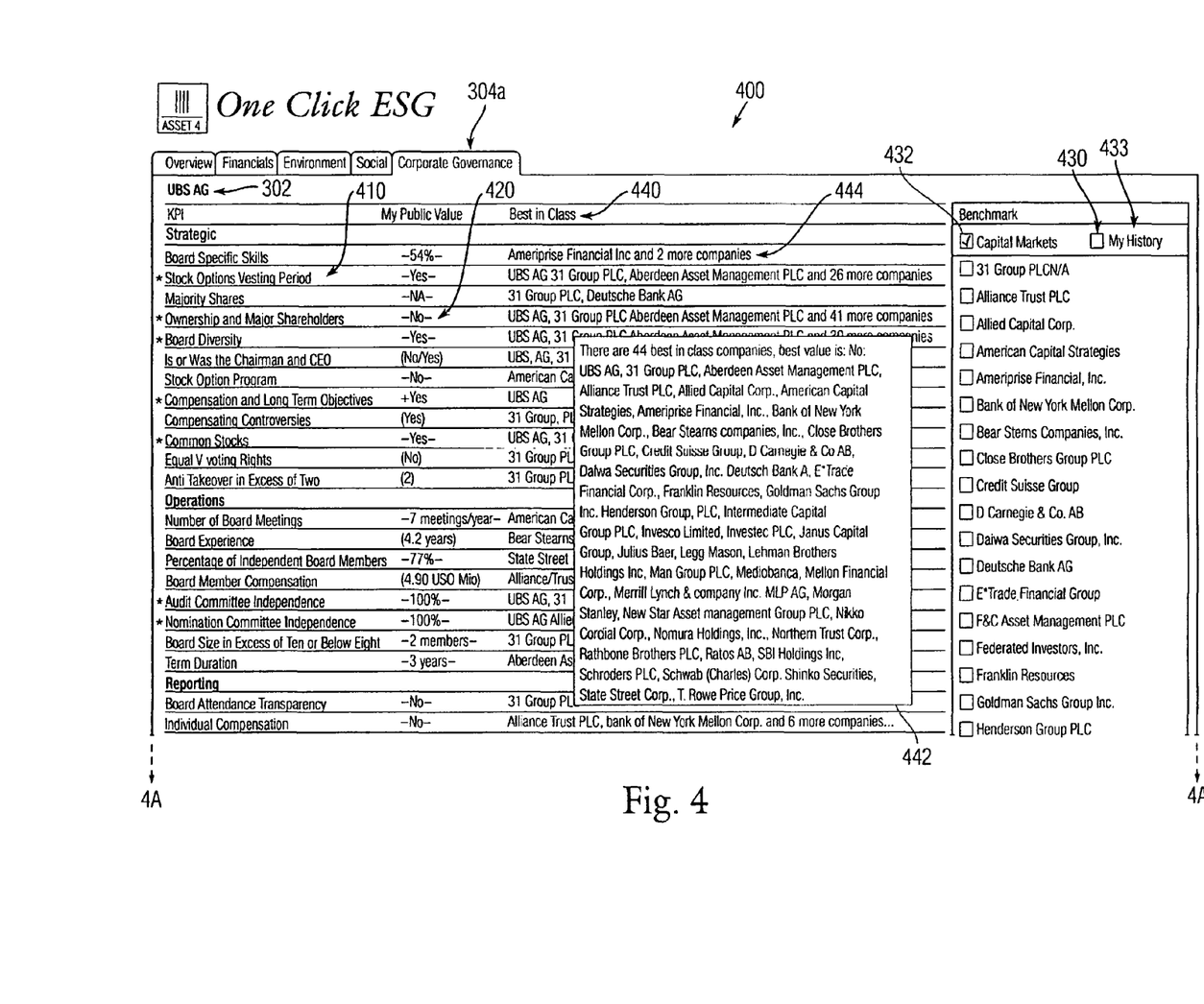
FIG. 4 illustrates a further interface presented by the host system to the user in accordance with an embodiment of the invention which is adapted to identify the indicators having best-in-class performance.
Figure 4A:
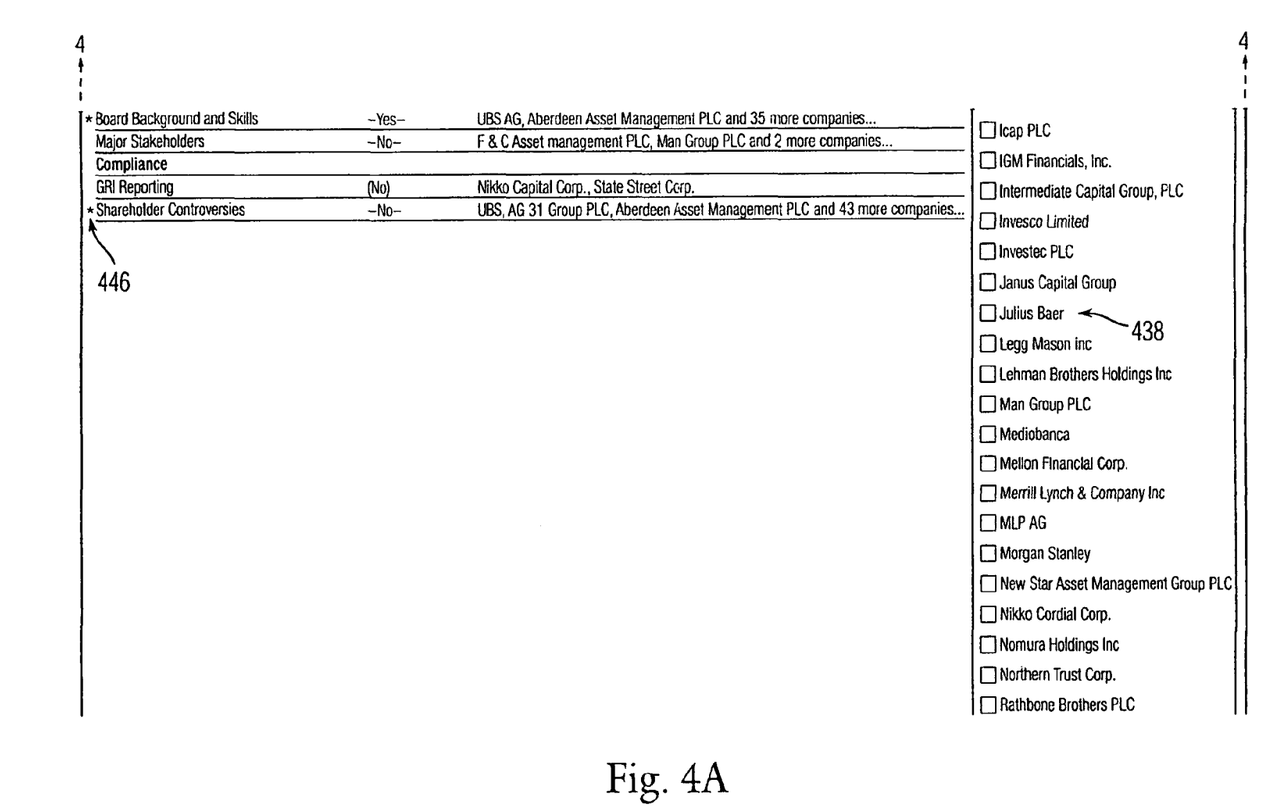
FIG. 4A is a continuation of FIG. 4 connected thereto along match lines 4A-4.

Referring now to the flow diagram of FIG. 2 and several views of the interface provided in FIGS. 3 through 5, a computer-implemented embodiment of the invention that processes ratings is illustrated. The process of FIG. 2 is implemented using code executing in a processor, as previously described, in an overall process for extracting indicators that represent underperformance or outperformance by a company of its peers or another benchmark.

At block 200, a user logs onto the host system in a conventional manner. This typically includes user authentication steps. At block 210, the user identifies his or her KPI selections (MyKPI). The steps taken at block 210 can comprise the process of FIG. 1, or can be a retrieval of previously saved MyKPI data. The user can now select a company to rate using his or her MyKPI selections, as indicated at block 220.

Figure 3A:
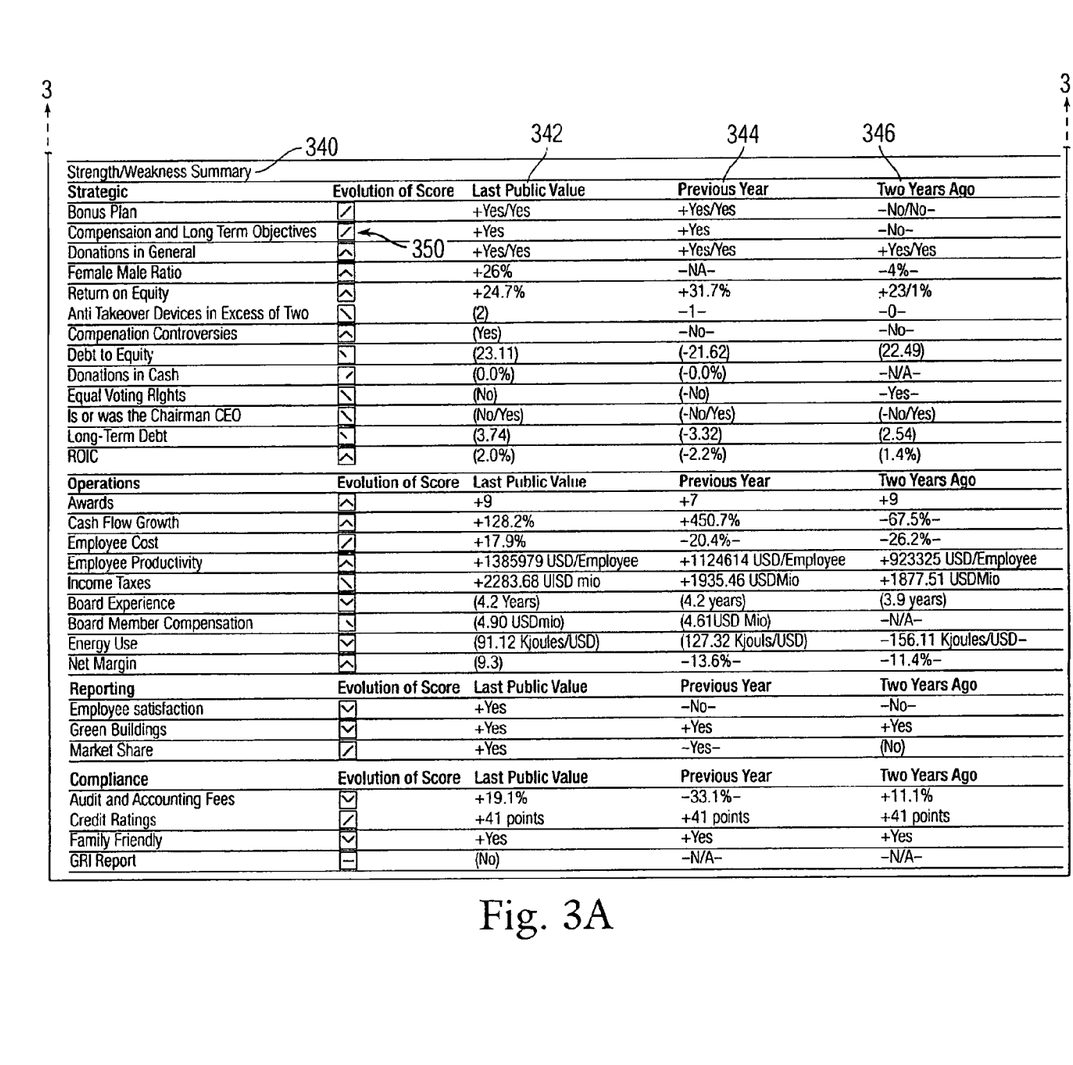
FIG. 3A is a continuation of FIG. 3 connected thereto along match lines 3A-3.

FIGS. 3 and 3A show an interface 300 that presents an overview concerning a company selected at block 220. In FIG. 3, the company 302 is "UBS AG," but that selection is for purposes of illustration only. With continued reference to FIG. 3, the interface 300 shows an overview page that has been populated with calculations concerning company 302, and provides tabs 304 that operate as interactive controls programmed to respond to interaction with the tabs 304 to navigate the user to a new interface screen that presents particular categories of indicators, as will be discussed more fully below. A variety of information associated with company 302 populates the interface 300 as a series of controls disposed along the top portion of the interface, including, by way of example, the homepage of the company, its base-country of operations, its generally accepted sector and industry, its assigned ISBN number, the primary exchange in which it is traded, and its trading symbol. Optionally, any of these data can be interacted with to provide further information. For example, by selecting the stock quote 306 (e.g., by clicking on it), a stock chart 308 can be called onto the overview page, and can be near-real time, if desired, to display intraday activity. Parameters of the chart can be interacted with as well, if desired, to change the data being plotted, or its range.

In pertinent part, FIG. 3 illustrates the result of step 230, in which MyKPIs have been provided to a rating algorithm and processed so as to compute a rating for the company 302 for each of the user-selected performance indicators, as indicated at step 240. In the illustrated example, the user has chosen 91 KPIs, as indicated at 310. The indicators for the selected company 302 are benchmarked against the industry or sector that includes the company, in this case the Capital Markets. The benchmark class of this example includes 46 peers, as indicated at 312. The benchmark can be changed by interacting with the benchmark notice 314 and identifying, for example, a sector (e.g., the financial sector), a geography, or a shared portfolio such as may be managed by the assetmasterProfessional software available from ASSET4, of Zurich, Switzerland. The same KPIs are provided to the rating algorithm and processed for each member of the benchmark class.

As a result, ratings for both the company and its benchmark class can be presented to the user, but some of the indicators that have selected as being of interest to the user for analysis do not provide meaningful information in comparison to the benchmark class. This is true when the company 302 has performance in-line with the general performance of the benchmark class. From an analytic point of view, in-line performance is not particularly helpful in assessing how a company is performing with regard to the user's key indicator choices. Rather, more meaningful information concerns those indicators that have broken out of the norm, either as a result of outperforming the benchmark class or as a result of underperforming the benchmark class. Unfortunately, in-line performance can obscure trends and ready-identification of these break-out scenarios.

To address this problem, the method proceeds at step 250 to divide the benchmark class (which includes the company 302) into at least three groups, and more preferably into four groups (quartiles), with each group having an approximately equal number of companies using code such as the aforementioned filtration module. Generally, it is preferred that each group has an equal number of companies, but the size of the benchmark class and the number of divisions may not permit that. For instance, in FIG. 3, the benchmark class has 46 companies, and so two groups can have 15 companies while one group has 16 companies. In this instance, the larger group can be the middle group (i.e., the first and last groups represent performance below 33% of the benchmark class and above 66% of the benchmark class, respectively).

FIG. 2 describes the preferred embodiment in which the host system defines quartiles for the benchmark class, as indicated at block 250. Thus, in the example of FIG. 3 in which the benchmark class has 46 companies, the first and last quartiles include 11 companies each while the two middle tiers include the remaining 24 companies. The values computed at block 240 for the each of the KPIs are sorted for the company 302 relative to the rest of the benchmark class, as indicated at block 260. For example, the KPI values can be sorted in ascending or descending order. In this way, the value computed for the company 302 for each KPI selected by the user is compared to the value computed for the remainder of the benchmark class. As the comparison proceeds, the values for each KPI is sorted by the code executing in the rating system. The sorted results are mapped to the divisions made to the benchmark class (e.g., to a respective quartile), as indicated at block 270.

The mapping places each of the MyKPIs in a defined division of the benchmark class. More particularly, there will be at least three divisions and in the preferred embodiment four divisions (quartiles) so as to be able to differentiate the relative rating of the company 302 from the benchmark class as follows: a first division will include those companies having a performance indicator rating that underperforms other companies in the benchmark class; a second division will include those companies having a performance indicator rating that outperforms other companies in the benchmark class; and any other divisions (e.g., a third division, a fourth division, etc.) will include those companies that have computed KPI rating values that are statistically closer to the mean or median than the members of the first and second divisions. As such, the other divisions encompass a remainder of the companies in the benchmark class. To be clear, the mapping proceeds on the basis of each individual KPI such that the company 302 can be mapped with respect to certain indicators as having outperformed a majority of the benchmark class while being mapped as being in-line with or underperforming the benchmark class with regard to other indicators.

It should be noted that users can define their own indicators.

Having so-mapped the MyKPIs, the host system can differentiate the particular KPIs and present to the user those that reveal a statistically significant departure from the benchmark class, whether upwards or downwards. In this regard, a subset of the user-selected performance indicators is presented through the interface 300. The subset preferably comprises only those performance indicator ratings of the first company that are in the first or second division. At block 280, the interface presents this subset of indicators, and their values in relation to the benchmark class. Optionally, the third division (mid-quartile or middle-range indicators) can be excluded from the presentation or provide a backdrop for the presentation of the first and second division indicators (e.g., the first and second division indicators can comprise wedges sized relative to their proportion of the selected indicators on a pie chart).

Turning now to the Scoreboard section 316 of interface 300, the performance of the company 302 ("UBS AG") relative to the benchmark class is indicated in the "overall summary" 318 as including 16 indicators that have "high" values (that is, outperform the benchmark class) and including 13 indicators that have "low" values (that is, underperform the benchmark class). These values are the result of a tabulating step in which the overall number of MyKPIs in the second and first divisions are counted. If the user clicks on a KPI, the interface is configured to respond to such action by presenting details concerning the KPI, such as the underlying values, the formulae that resulted in the value(s), or a combination of such details. Optionally, the high and low values can be color coded to differentiate them on the screen. In this regard, "high" can be green and "low" can be red, for instance. Optionally, a bar graph or pie chart can be provided to graphically depict the magnitude of outperform and underperform indicators included in the MyKPI set. Preferably, the underperform (first division) and outperform (second division) are plotted adjacent to one another and/or adjacent to the tabulated value provided in the overall summary section 318. Each segment of the bar graph preferably has a span that is consistent throughout the interface to provide a uniform presentation of data of the same magnitude (i.e., a breakout of 2 indicators is twice as long a graph as a breakout of 1 indicator). Depending on the spread of indicators for a given company, the length of one unit of the bar graph might change. Also, the bar graph can be color coded in the same way as the tabulated values. All of this is managed by the code executing in the processor, as will be understood by persons of ordinary skill in the art.

What should be appreciated is that of the 91 indicators in the set MyKPI, only 29 resulted in breakout performance by the company 302. Thus, 62 indicators for the company "UBS AG" fell in-line with the performance of the benchmark class. As a result of limiting the presentation of information to the 29 breakout indicators, the information is focused on the key indicators that have statistically significant departures from the mean and median values in the benchmark class, The Scoreboard section 316 includes two somewhat more detailed summaries, a summary by tab section 320 and a summary by COSO section 330. The summary by tab section 320 includes tabulated values for the indicators associated with each of four categories, namely, financials 322, environment 324, social 326, and corporate governance 328. These categories correspond to the tabs 304, and the breakout indicators for the company 302 (29 in this example) are organized in accordance with these tabbed categories. In other words, there are 12 associated with financials, 2 associated with environment, 7 associated with social and 8 associated with corporate governance, for a total of 29 indicators. Each tabbed category includes a tabulated value of "high" and "low" values, and can be color coded as described above. Further, as shown, each can include a bar graph or pie chart depiction of the magnitude of the outperform and underperform indicators included in the MyKPI set for each category, and the bar graph can be adjacent to the tabulated values for each category, and the outperform bar graph can be adjacent to the underperform bar graph (and can similarly be color coded). The COSO section 330, if provided, is organized in a similar manner, except that the indicators the correspond to COSO categories strategic 332, operations 334, reporting 336, and compliance 338 differ from those of the tabbed categories, and so the tabulated values of the COSO categories differ from those of the tabbed categories. A configuration file can include a setting that governs the manner of presentation of the summary data.

Strength and weakness tabs 304b can also be provided, as shown in FIG. 3, to provide further detail with regard to the outlier-indicators that represent the strengths and weaknesses, respectively, of the measured performance indicators. The user can interact with these tabs in order to cause the interface to display details concerning the top/bottom KPIs. The strengths/weaknesses tabs can also cause the presentation of KPIs in relation to their historical values.

Another point to appreciate is that the entire summary section 316 conveys information regarding the outbreak KPIs without providing any numerical values concerning the values of the KPIs. Rather, the tally of KPIs that outperform or underperform the benchmark class, as a group or within categories, provides an indication of the performance of the company 302. Thus, in the illustrated example of FIG. 3, the company 302 has an excellent social performance (6 outperform and 1 underperform) and a poor corporate governance performance (1 outperform verses 7 underperform). Depending on the user's perspective, this data—independent of the underlying values of the indicators can be sufficient to guide a decision to purchase or sell a position in this company.

Turning now to the strength/weakness summary 340, indicators are shown arranged in accordance with COSO categories (though that is not required). The indicators are arranged in columnar fashion so as to associate each indicator with a respective reported public value 342. The reported public value preferably is a user-selectable parameter that can be input or defined through the interface so that the user can define the period of interest. Thus, the last public values 342 can be for a current year or for a different, specified year. In either case, it is preferred that additional columns be supplied with data for preceding years to provide a historical reference to the data being shown. Thus, if the "last public year" is 2007, then columns 344 and 346 would display figures for 2006 and 2005, respectively. The values in these columns preferably are color coded to indicate whether the KPI is an outperforming or an underperforming indicator. Consistent with the foregoing discussion, each of the indicators being presented in the interface is one that has outperformed or underperformed the benchmark class. If the company 302 had a performance value in one of the selected indicators that was inline with the mid-quartile benchmark companies, as is the case for 62 of the 91 selected indicators, then those indicators are excluded from the interface 300.

Referring again to FIG. 3, a mini-chart 350 that depicts the "evolution of score" for each indicator is provided as a tool for the user. The chart 350 plots only three points, but conveys a significant amount of information. Each chart plots over the interval of interest (namely, the two years leading up to the year selected for the last public value data 342) the performance of the indicator, year-over-year. If the year-over-year performance improves each year, then a straight, upwardly oriented line is plotted; if the year-over-year performance improves and then declines, an upside-down V is plotted; and so on. As well, the plotted data can be color coded to indicate improvements in green and declines in performance in red, for example.

Referring now to FIG. 4, interface 400 is presented by the host system to the user in response to the user selecting tab 304a (corporate governance). The interface 400 provides a view into the rating system that is arranged around one category of rating data, corporate governance. As can be appreciated, the detail in interface 400 is coordinated to the COSO divisions of information. In FIG. 4, since the user has selected to review details, there is no filtering of the user-selected indicators. Instead, all of the chosen KPIs (that is, all of the 91 KPIs in this example that relate to corporate governance) are shown in column 410 for company 302. In association with each KPI, the interface 400 presents "My Public Value" which is the rating accorded to each indicator as calculated by the rating algorithm, optionally in view of any coefficient values specified by the user and/or invoked in this session with the host server. The same rating algorithm and coefficients are applied to the benchmark 430. In FIG. 4, the benchmark that selected from the selection list 430 is the benchmark class "industry: capital markets" 432, which includes 46 peer companies (see FIG. 3, element 312). Alternatively, a MyHistory selection 433 can bring up onto the screen to show historical values for the company or prior benchmark selections that can be repeated for comparison to the current company 302/year of operation under inspection. When a benchmark class is selected, the company 302 can be evaluated relative to its peers and the best-in-class can be identified for each indicator. Best-in-class refers to the companies in the benchmark class, including company 402, that have the highest of the outperforming indicators. In some cases, as shown by rollover 442, most all of the peers can have similar values for a given indicator and so the best-in-class category can be large. For other indicators, however, there may only be 2 or 3 companies that qualify as best-in-class and that are so-denoted. When the selected company 302 is a best in class member, it can be flagged as-such in order to distinguish those user-selected indicators in which the company 302 has achieved best-in-class ranking from a remainder of the user-selected performance indicators. For example, a flag 446 such as an asterisk can be added adjacent the indicator.

On the other hand, if in FIG. 4 the user identifies individual members of the benchmark class such as members 434, 436, and 438, then an interface 500 presents a direct comparison of the company 302 to those benchmark class members, as shown in FIG. 5. In FIG. 5, the leftmost columns remain unchanged while the best-in-class field is replaced with a direct comparison 510 of the selected members to the company 502. The direct comparison presents the computed values 420 for the company 302 along side the values for the selected benchmark members. The best and worst among the compared entities can be highlighted, if desired. Thus, if Deutsche Bank outperforms the other companies in "Board Specific Skills" it can be highlighted, say, in green, as indicated at 512, and if Julius Baer underperforms in this indicator, it too can be highlighted, say, in red, as indicated at 514. Likewise, when company 302 outperforms (see 524) or underperforms (see 522), that can be highlighted using a color code as previously described. On the other hand, if one of these companies simply performs in line with the others in this comparison, e.g., within a middle-division position of the percentile ranking of the benchmark class, then the performance need not be highlighted. Instead of head-to-head comparisons, the MyValue calculation for the company 302 can be presented in relation to a value calculated for the entire benchmark class or a broader selection than the two or three companies that can be displayed within the interface 500. For example, if the benchmark class has 48 companies, then if there are three divisions there are 16 companies in each division, and if there are four divisions there are 12 companies in each division. The percentile rank of each company is the ranking of a given indicator's performance relative to the same indicator of the other companies in the benchmark class. The performance is sorted to identify the comparative ranking within the class, and those results are seated within the divisions with the middle tier(s) constituting "in-line" performance that need not be highlighted.

Figure 3B:
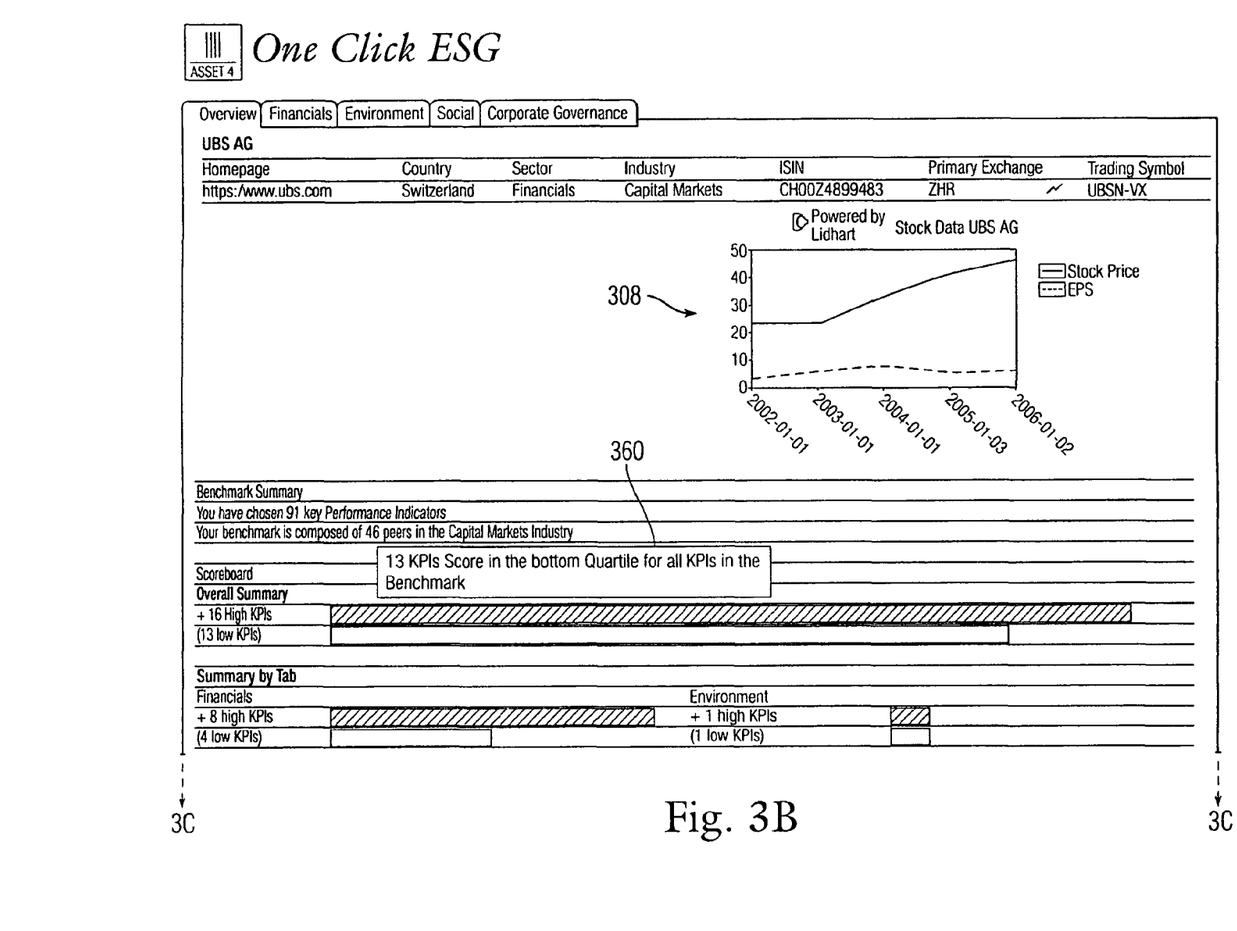
FIG. 3B illustrates further features that can be included in an interface such as that of FIG. 3.
Figure 3C:
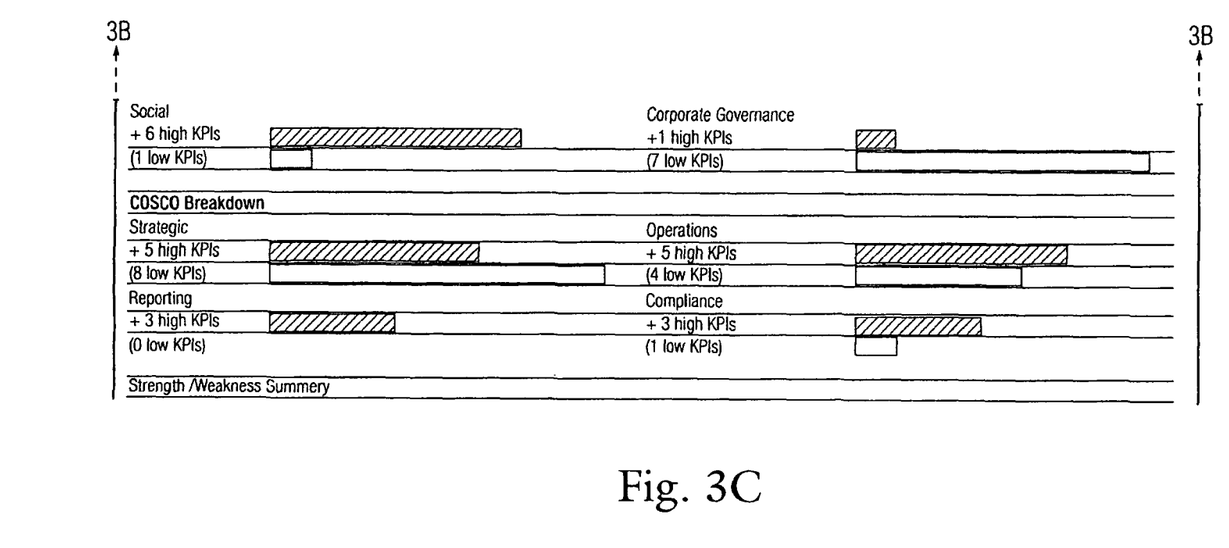
FIG. 3C is a continuation of FIG. 3 connected thereto along match lines 3C-3B.
Figure 5A:
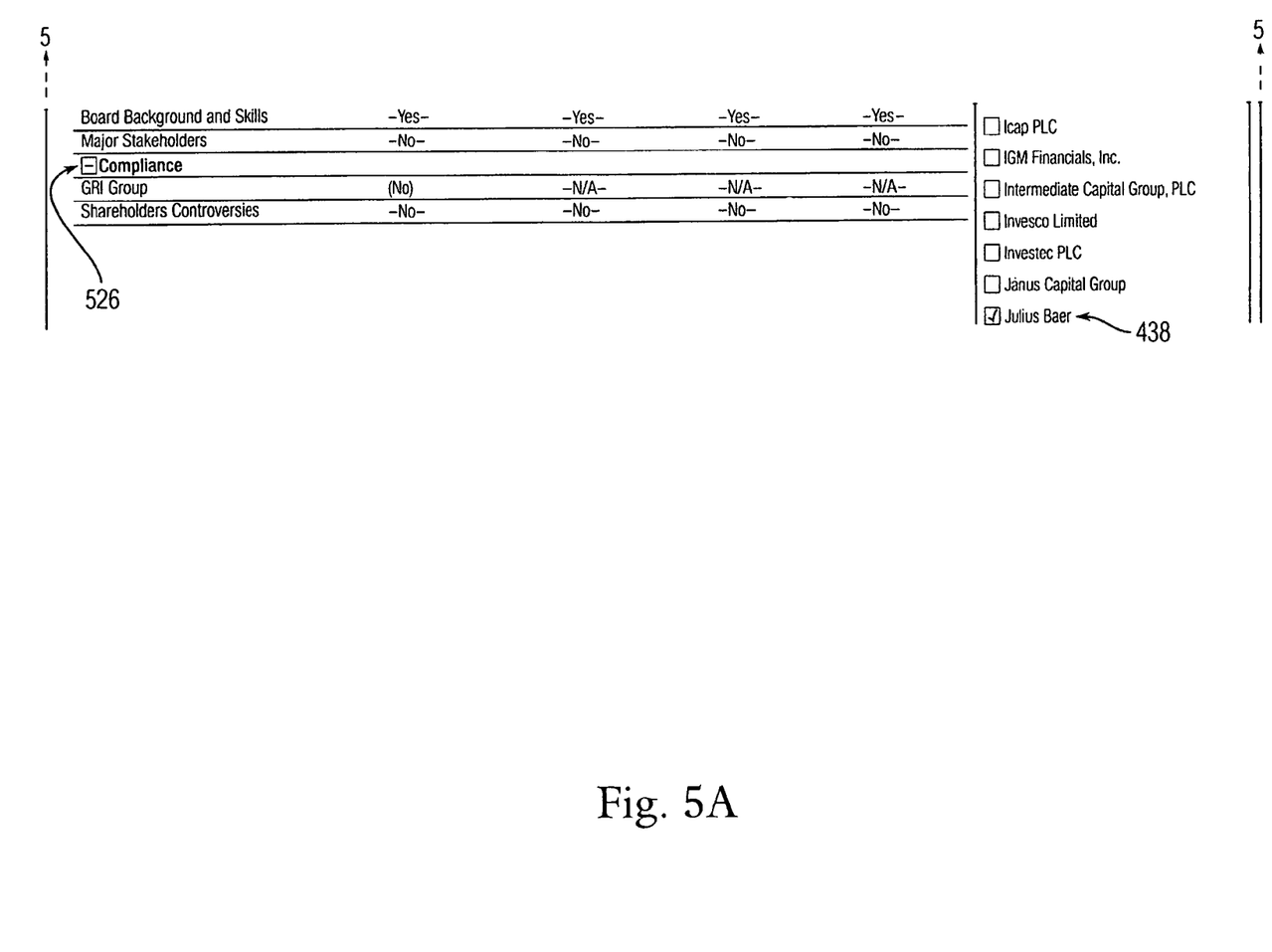
FIG. 5A is a continuation of FIG. 5 connected thereto along match lines 5A-5.

Note that the user can interact with the tabulated values in either the summary section 316 or the strength/weakness section 340, and that can cause the display of more detailed information (e.g., the user can drill down through hierarchical layers of indicators until the underlying data is revealed for inspection by the user), or such interaction can center the interface 300 on further information that may already be included within the presentation of data (e.g., clicking on the overall summary can center the interface 300 on the strength/weakness summary 340). In addition, a user can roll-over the presented data to reveal further information, such as is shown in rollover-dialog box 360 in FIG. 3B. Rollovers can be provided throughout the interface, including the mini-charts 350. In part, the rollovers can provide top and bottom quartile information (such as the cutoff values that separate those quartiles from the mid-quartiles), and can provide a zoom-feature to review underlying data. (The zoom-feature is described in the aforementioned co-pending U.S. patent application Ser. No. 11/071,980). For instance, this can be implemented through additional server requests (e.g., AJAX from client side with results presented in a HTML div). Alternatively, throughout the interface provided by the host system, a user can click on a particular piece of presented data and be presented with the underlying data that drives the value being displayed, and can click on that resulting information to see lower levels of underlying data. In addition, a collapse/expand control 526 such as shown in FIG. 5A next to the "Compliance" heading can be used to selectively display or hide the key indicators in a given category, such as Compliance. Similar controls can selectively reveal or hide indicators for other categories (e.g., overall summary 318, environment 324, shareholder controversies 446, etc.).Optionally, tabs and other controls can execute programs and code (Adobe Flash, Gapminder, JavaScript (client side), PHIP (server side), etc.) that can provide historical information on the user's selected KPIs, company's investigated and their rankings (MyValue).

A sandbox can be provided that is configured to accept from the user hypothetical values for one or more of the KPIs. In this variation of the invention, an additional column can be presented next to the MyValue column, like a "future" year column. This is implemented though interaction between the client and server with the process of FIG. 2 executing on the changed values. The hypothetical values for the KPIs are valid for at least the session that they are being used, though might be stored by the user for future reference.

A news channel can be provided that provides information on the company 302 that has been identified, or on a set of companies selected by the user over time and stored in a list (e.g., "MyCompanies"). The news stores on the channel can also be oriented around one or more of the pillars as a filter to provide only news about corporate governance issues, etc. The channel comprises an active feed of data to one or more of the interface screens, or to a separate screen.

While the invention has been described in connection with a certain embodiment thereof, the invention is not limited to the described embodiments but rather is more broadly defined by the recitations in the claims below and equivalents thereof.

We claim:

1. A method of operating a computer-implemented rating system having access to a database populated with data concerning properties of each entity in an entity class comprising a plurality of entities, the method comprising the steps of:
   entering, through an interface of the computer-implemented rating system, user-selected performance indicators associated with one or more of the properties;
   computing a rating for each of the user-selected performance indicators for each entity in the entity class using a processor executing code, the executing code being operative to perform the steps of:
   applying at least the user-selected performance indicators to a rating algorithm;
   dividing the entity class into at least three approximately equal number of entities; and
   for each of the performance indicator ratings of a first entity:
   sorting the performance indicator rating of the first entity relative to a respective performance indicator of the other entities in the entity class;
   mapping the sorted results to one of the at least two divisions of the entity class, whereby the sorted results are included in a first division having entities with the performance indicator rating that underperforms other entities in the entity class, and a second division having entities with the performance indicator rating that outperforms other entities in the entity class;
   filtering, from the sorted results, one or more performance indicator ratings of the first entity having rating values that are statistically closer to the mean or median respective performance indicators of the other entities in the entity class, relative to the sorted results that are mapped to at least one of the first division and the second division;

presenting, through the interface and in relation to one or more historical values, information relating to the user-selected performance indicators that comprise the performance indicator ratings of the first entity that are (a) in the first and second divisions and (b) that reflect a statistically significant departure from the respective performance indicator of the other entities in the entity class;

excluding from presentation through the interface the one or more performance indicator ratings of the first entity having rating values that are statistically closer to the mean or median respective performance indicators of the other entities in the entity class, relative to the sorted results that are mapped to at least one of the first division and the second division; and identifying the presented information as belonging to the first and second divisions, respectively.

2. A method according to claim 1, wherein the presenting step includes the step of tabulating any performance indicator ratings of the first entity that have been included in the first division, tabulating any performance indicator ratings of the first entity that have been included in the second division, and wherein the information relating to the first subset of the user-selected performance indicators comprises presenting the tabulated value for the first and second divisions.

3. The method of claim 2, wherein each property belongs to a property category comprising a plurality of different property and each user-selected performance indicator is associated with a property category,
wherein the tabulating step for the first division includes the step of tabulating for each property category a number of user-selected performance indicators that are included in the first division;
wherein the tabulating step for the second division includes the step of tabulating for each property category a number of user-selected performance indicators that are included in the second division; and
wherein the presenting step presents the tabulated values for each property category in the first and second divisions.

4. The method of claim 1, wherein the presenting step includes presenting only the performance indicators that are in the first and second division.

5. The method of claim 1, wherein the information relating to the first subset of the user-selected performance indicators comprises, for each indicator in the fast subset, a chart that depicts changes in the value of that performance indicator over an interval.

6. The method of claim 1, wherein the dividing step comprises dividing a benchmark class into quartiles and wherein the first division includes the first quartile and the second division includes the last quartile.

7. The method of claim 1, wherein the entering step comprises selecting the user-selected performance indicators from an account associated with the user.

8. The method of claim 1, including the additional steps of providing a user with a selectable set of performance indicators, and obtaining the user-selected performance indicators through the interface based upon interaction with the selectable set.

9. The method of claim 1, wherein the comparing step retrieves ratings for the benchmark class from a data store.

10. The method of claim 1, wherein the sorting step comprises sorting the results of the comparison in either ascending or descending order.

11. The method of claim 1, wherein each user-selected performance indicator is associated with a particular category, and wherein the interface includes controls operative to cause a presentation of either an overview of the information relating to the user-selected performance indicators or a particular category-view of the information relating to the user-selected performance indicators.

12. The method of claim 11, wherein the category-view, includes a selection list selectable to identify either a benchmark class or individual members of the benchmark class, the method including the additional step of obtaining a selection from the selection list.

13. The method of claim 12, wherein, in response to the obtaining step obtaining the benchmark class as the selection, the interface presents:
a. the user-selected performance indicators that are in the particular category-view,
b. a value of the performance indicator rating for the first company that is associated with the user-selected indicators, and
c. an indication of which companies in the benchmark class are best-in-class.

14. The method of claim 13, wherein a portion of the performance indicators that qualify as best-in-class are distinguished from a remainder of the performance indicators.

15. The method of claim 14, wherein, in response to the obtaining step obtaining individual members of the benchmark class as the selection, the interface presents:
a. the user-selected performance indicators that are in the particular category-view,
b. a value of the performance indicator rating for the rated entity that is associated with the user-selected performance indicators, and
c. a value of the performance indicator rating for the individual members of the benchmark class that were selected through the interface,
whereby, the rated entity is presented in direct comparison to the selected benchmark class members.

16. In a computer-implemented rating system having access to a database populated with data concerning both economic and non-economic factors for a benchmark class that includes a number of companies, a method comprising the steps of:
receiving, through an interface of the computer-implemented rating system, user-selected performance indicators associated with one or more of the economic and non-economic factors;
computing, using code executing in a processor of the computer-implemented rating system, a rating for each of the user-selected performance indicators and for each company in the benchmark class by applying at least the user-selected performance indicators to a rating algorithm;
dividing, using code executing in a processor of the computer-implemented rating system, the benchmark class into at least three approximately equal number of companies; and
for each of the performance indicator ratings of a first company:
sorting, using code executing in a processor of the computer-implemented rating system, the performance indicator rating of the first company relative to a respective performance indicator of the other companies in the benchmark class;
mapping, using code executing in a processor of the computer-implemented rating system, the sorted results to one of the at least two divisions of the benchmark class, whereby the sorted results are included in a first division having companies with the performance indicator rating that underperforms other companies in the benchmark class, and a second division having companies with the performance indicator rating that outperforms other companies in the benchmark class;

filtering, from the sorted results, using code executing in a processor of the computer-implemented rating system, one or more performance indicator ratings of the first entity having rating values that are statistically closer to the mean or median respective performance indicators of the other entities in the entity class, relative to the sorted results that are mapped to at least one of the first division and the second division;

presenting, through the interface and in relation to one or more historical values, using code executing in a processor of the computer-implemented rating system, information relating to the user-selected performance indicators that comprise the performance indicator ratings of the first company that are (a) in the first and second divisions and (b) that reflect a statistically significant departure from the respective performance indicator of the other entities in the entity class;

excluding from presentation through the interface, using code executing in a processor of the computer-implemented rating system, the one or more performance indicator ratings of the first entity having rating values that are statistically closer to the mean or median respective performance indicators of the other entities in the entity class, relative to the sorted results that are mapped to at least one of the first division and the second division; and identifying the presented information, using code executing in a processor of the computer-implemented rating system, as belonging to the first and second divisions, respectively.

17. The method of claim 16, wherein the presenting step includes presenting only the performance indicators that are in the first and second division.

18. The method of claim 16, wherein the presenting step includes the step of tabulating any performance indicator ratings of the first company that have been included in the first division, tabulating any performance indicator ratings of the first company that have been included in the second division, and wherein the information relating to the first subset of the user-selected performance indicators comprises presenting the tabulated value for the first and second divisions.

19. The method of claim 18, wherein the presenting step includes the additional step of graphing the tabulated value of the first division adjacent to the tabulated value of the second division.

20. The method of claim 18, wherein the presenting step includes the additional step of color-coding the presentation of the tabulated value of the first and second divisions.

21. The method of claim 18, wherein each user-selected performance indicator is associated with a category,
  wherein the tabulating step for the first division includes the step of tabulating for each category a number of user-selected performance indicators that are included in the first division;
  wherein the tabulating step for the second division includes the step of tabulating for each category a number of user-selected performance indicators that are included in the second division; and
  wherein the presenting step presents the tabulated values for each category in the first and second divisions.

22. The method of claim 21, wherein the categories are selected from the group consisting of: financials, social, environmental, corporate governance, strategic, reporting, operations, and compliance.

23. The method of claim 21, wherein the presenting step includes the additional step of graphing the tabulated values for each category of the first division adjacent to the respective tabulated values for each category of the second division.

24. The method of claim 21, wherein the presenting step includes the additional step of color-coding the presentation of the tabulated value of the first and second divisions.

25. The method of claim 16, wherein the information relating to the user-selected performance indicators comprises a reported public value for each of the performance indicators.

26. The method of claim 25, wherein the reported public value concerns a year of interest defined by the user through the interface.

27. The method of claim 16, wherein the information relating to the user-selected performance indicators comprises, for each indicator, a chart that depicts changes in the value of that performance indicator over an interval.

28. The method of claim 16, wherein the dividing step comprises dividing a benchmark class into quartiles and wherein the first division includes the first quartile and the second division includes the last quartile.

29. The method of claim 16, wherein the entering step comprises selecting the user-selected performance indicators from an account associated with the user.

30. The method of claim 16, including the additional steps of providing a user with a selectable set of performance indicators, and obtaining the user-selected performance indicators through the interface based upon interaction with the selectable set.

31. The method of claim 16, wherein the first company rating is computed in response to a company-selection made by a user at the interface.

32. The method of claim 16, wherein the comparing step retrieves ratings for a benchmark class from a data store.

33. The method of claim 16, wherein the sorting step comprises sorting the results of the comparison in either ascending or descending order.

34. The method of claim 16, including the additional step of providing a control within the interface that is associated with the first company and operable to present a stock chart of the first company in response to interaction with the control.

35. The method of claim 16, wherein each user-selected performance indicator is associated with a particular category, and wherein the interface includes controls operative to cause a presentation of either an overview of the information relating to the first subset or a particular category-view of the information relating to the first subset.

36. The method of claim 35, wherein the category-view, includes a selection list selectable to identify either a benchmark class or individual members of the benchmark class, the method including the additional step of obtaining a selection from the selection list.

37. The method of claim 36, wherein, in response to the obtaining step obtaining the benchmark class as the selection, the interface presents:
  a. the user-selected performance indicators that are in the particular category-view,
  b. a value of the performance indicator rating for the first company that is associated with the user-selected indicators, and
  c. an indication of which companies in the benchmark class are best-in-class.

38. The method of claim 37, wherein a portion of the performance indicators of the first company that qualify as best-in-class are distinguished from a remainder of the performance indicators.

39. The method of claim 36, wherein, in response to the obtaining step obtaining individual members of the benchmark class as the selection, the interface presents:
  a. the user-selected performance indicators that are in the particular category-view,
  b. a value of the performance indicator rating for the first company that is associated with the user-selected performance indicators, and
  c. a value of the performance indicator rating for the individual members of the benchmark class that were selected through the interface,
    whereby, the first company is presented in direct comparison to the selected benchmark class members.

\* \* \* \* \*